United States Patent
Takada (10) Patent No.: US 6,539,606 B2
(45) Date of Patent: Apr. 1, 2003

(54) METHOD OF AND APPARATUS FOR LAMINATING METAL RINGS

(75) Inventor: Kazutoshi Takada, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/870,470

(22) Filed: Jun. 1, 2001

(65) Prior Publication Data

US 2002/0013190 A1 Jan. 31, 2002

(30) Foreign Application Priority Data

Jun. 2, 2000 (JP) .................................... 2000-165779

(51) Int. Cl.7 ............................................. B23Q 3/00
(52) U.S. Cl. ............................ 29/468; 29/235; 29/446; 29/450; 29/464; 29/469; 269/47; 269/50
(58) Field of Search ..................... 29/225, 226, 227, 29/229, 235, 446, 450, 451, 464, 468, 469, 505; 269/47, 50, 53

(56) References Cited

U.S. PATENT DOCUMENTS

| | | | | |
|---|---|---|---|---|
| 1,965,876 A | * | 7/1934 | Bettis | 29/450 |
| 3,078,556 A | * | 2/1963 | Carroll | 29/226 |
| 3,115,699 A | * | 12/1963 | Nakahira | 29/226 |
| 4,205,424 A | * | 6/1980 | Nagao et al. | 29/407.1 |
| 4,222,161 A | * | 9/1980 | Duval et al. | 29/235 |
| 4,338,081 A | * | 7/1982 | Hattori et al. | 474/201 |
| 4,433,965 A | * | 2/1984 | Hattori et al. | 474/201 |
| 4,457,742 A | * | 7/1984 | Hattori et al. | 474/201 |
| 4,692,985 A | * | 9/1987 | Van Dijk | 29/450 |
| 5,845,384 A | * | 12/1998 | Retzbach | 29/450 |
| 6,217,472 B1 | * | 4/2001 | Fujioka et al. | 474/242 |
| 6,238,313 B1 | * | 5/2001 | Smeets et al. | 474/244 |
| 6,270,437 B1 | * | 8/2001 | Yoshida et al. | 474/248 |
| 6,334,830 B1 | * | 1/2002 | Yagasaki et al. | 474/242 |

FOREIGN PATENT DOCUMENTS

JP 63281725 11/1998

* cited by examiner

Primary Examiner—Gregory M. Vidovich
Assistant Examiner—Essama Omgba
(74) Attorney, Agent, or Firm—Birch, Stewart, Kolasch & Birch, LLP (57) ABSTRACT

A metal ring having a greatest circumferential length is held in the shape of a substantially true circle, and other metal rings are arrayed in the order of increasing circumferential length toward the metal ring of the greatest circumferential length. At least three holder rods are lowered into the metal rings to hold the metal rings in substantially coaxial alignment with each other. Presser rods are pressed from outside of the metal rings toward the center of the metal rings, thereby deforming the metal rings into a shape including curved portions projecting radially and having a reduced diameter. The deformed metal rings are delivered successively in the array from terminal ends of the presser rods into the metal ring of the greatest circumferential length. The deformed metal rings that are released off the presser rods restore their original shape within the metal ring of the greatest circumferential length, and are laminated to the metal ring of the greatest circumferential length.

8 Claims, 7 Drawing Sheets

METHOD OF AND APPARATUS FOR LAMINATING METAL RINGS

BACKGROUND OF THE INVENTION

1. Field of the Invention

The present invention relates to a method of and an apparatus for laminating a plurality of endless metal rings.

2. Description of the Related Art

Power transmitting belts for use in continuously variable transmissions for automobiles comprise a plurality of elements stacked in an annular array and bundled by laminated rings for endless circular motion. Each of the laminated rings comprises a plurality of endless metal rings having a predetermined axial width and also having respective different circumferential lengths. The endless metal rings are laminated successively in the order of increasing circumferential length from the outer circumferential side toward the inner circumferential side.

It has heretofore been customary to laminate the metal rings by manually fitting each metal ring, which is held in the shape of a substantially true circle, in an adjacent metal ring against its inner circumferential surface successively in the order of increasing circumferential length. However, the manual fitting process cannot easily be performed because the difference between the circumferential lengths of outer and inner metal rings to be fitted together is very small in order to produce a highly accurate laminated ring that comprises metal rings stacked closely together. If an attempt is made to manually fit the metal rings roughly without sufficient care, then the metal rings tend to be damaged when they contact each other, and when the resultant power transmitting belt is used, its efficiency to transmit power is liable to decrease and the laminated ring is apt to be broken.

Japanese laid-open patent publication No. 63-281725 discloses a process of laminating metal rings which has been proposed to eliminate the above drawbacks. According to the disclosed process, an annular metal ring is pressed radially inwardly toward its center by three presser rods to form radially inwardly projecting curved regions, thus deforming the metal ring into a shape having a smaller diameter than its original diameter. The deformed metal ring is then released from the presser rods to restore its original shape within another annular metal ring, so that the two metal rings are laminated to each other.

Since the inner metal ring and the outer metal ring do not contact each other until the inner metal ring restores its shape within the outer metal ring, the metal rings are prevented from being damaged by any manual fitting process which would otherwise have been carried out.

However, since the proposed process needs to repeat a cycle of deforming an inner metal ring into a smaller-diameter shape, placing the deformed metal ring into an outer metal ring, and then laminating the inner metal ring to the outer metal ring, the process tends to be time-consuming and poor in efficiency if the number of metal. belts to be laminated is relatively large.

SUMMARY OF THE INVENTION

It is therefore an object of the present invention to provide a method of and an apparatus for laminating a plurality of metal rings efficiently in a short period of time even if a large number of metal rings are to be laminated.

To achieve the above object, there are provided in accordance with the present invention a method of and an apparatus for laminating a plurality of endless metal rings having different respective circumferential lengths successively in the order of increasing circumferential length from the outer circumferential side toward the inner circumferential side. The method comprises the steps of holding the metal ring of the greatest circumferential length in the shape of a substantially true circle and holding the other metal rings in an array successively in the order of increasing circumferential length toward the metal ring of the greatest circumferential length in a transverse direction of the metal ring of the greatest circumferential length, inserting at least three holder rods, which are spaced from each other and extend parallel to each other, into the metal rings along the array thereof to hold the metal rings in substantially coaxial alignment with each other, while holding the metal rings from inner surfaces thereof with the holder rods, pressing at least three presser rods, which are disposed in respective locations corresponding to spaces between the holder rods, from outside of the other metal rings through the spaces between the holder rods toward the center of the metal rings, thereby deforming the other metal rings resiliently into a shape including curved portions projecting radially along the holder rods and having a reduced diameter, and delivering the deformed metal rings successively in the array along the presser rods from terminal ends of the presser rods into a position in which the metal ring of the greatest circumferential length is held, and releasing the deformed metal rings successively off the presser rods within the metal ring of the greatest circumferential length to allow the released metal rings to successively restore a shape of a substantially true circle along an inner circumferential surface of the metal ring of the greatest circumferential length and to be successively laminated to the metal ring of the greatest circumferential length.

With the above method, before the metal rings are laminated, the metal rings other than the metal ring of the greatest circumferential length are arrayed in the order of increasing circumferential length toward the metal ring of the greatest circumferential length, and the arrayed metal rings are simultaneously pressed into the deformed shape by the presser rods. Then, the deformed metal rings are delivered successively in the array off the terminal ends of the presser rods, and resiliently restore to their original shape successively in the order of increasing circumferential length within the metal ring of the greatest circumferential length, whereupon the metal rings are laminated to the metal ring of the greatest circumferential length. Therefore, all the metal rings can be successively laminated in a short period of time with a highly increased efficiency.

According to the present invention, there is also provided an apparatus for laminating a plurality of endless metal rings having different respective circumferential lengths successively in the order of increasing circumferential length from the outer circumferential side toward the inner circumferential side, comprising an assembly holder for holding the metal ring of the greatest circumferential length in the shape of a substantially true circle, an array holder for holding the other metal rings in an array successively in the order of increasing circumferential length downwardly in the assembly holder toward the metal ring of the greatest circumferential length in a transverse direction of the metal ring of the greatest circumferential length, at least three holder rods, which are spaced from each other and extend parallel to each other, vertically movable toward the array holder for being into the metal rings along the array thereof to hold the metal rings in substantially coaxial alignment with each other when the holder rods are lowered, at least three presser rods for pressing the metal rings from outside of the metal rings in the array holder through spaces between the holder rods toward the center of the metal rings, thereby deforming the metal rings in the array holder resiliently into a shape including radially projecting curved portions held by the holder rods and having a reduced diameter, and delivery means for delivering the deformed metal rings in the array holder successively in the array toward the assembly holder and releasing the deformed metal rings successively off the presser rods.

With the above apparatus, the metal rings arrayed in the array holder are aligned by the holder rods to allow the presser rods to press the metal rings with high accuracy. The presser rods press the metal rings between the holder rods to reliably form the curved portions along the holder rods in the metal rings. Therefore, the metal rings can sufficiently deformed into the shape having the reduced diameter.

The apparatus further comprises a limit plate for limiting the presser rods by abutting against the presser rods when the presser rods press and deform the metal rings, the limit plate being disposed inwardly of the holder rods in an upper portion of the array holder. The limit plate allows the presser rods to deform the metal rings quickly to the desired shape having the reduced diameter.

When the metal rings are delivered by the delivery means, the metal rings are reliably kept in their array by being guided by the presser rods, and accurately delivered in the array off the terminal ends of the presser rods.

Because the holder rods are vertically movable, they may be lifted out of the metal rings when the metal rings are delivered by the delivery means. With the holder rods lifted out of the metal rings, any sliding resistance applied to the metal rings is reduced when the metal rings are delivered by the delivery means.

According to a first aspect of the present invention, the delivery means comprises a plurality of vertically movable abutment members movable along upper edges of the metal rings held in the array holder, lifting and lowering means for lifting and lowering the abutment members in unison with each other by a distance required to deliver the lowermost one of the metal rings in the array holder off terminal ends of the presser rods, and displacing means for retracting the abutment members which have been lowered by the lifting and lowering means in unison with each other away from spaces between the metal rings and inserting the abutment members which have been lifted by the lifting and lowering means in unison with each other into the spaces between the metal rings.

With the delivery means according to the first aspect, the displacing means moves the abutment members along the upper edges of the metal rings arrayed in the array holder. Then, the abutment members are lowered in unison with each other by the lifting and lowering means. The upper edges of the metal rings abut against the abutment members, and are moved downwardly. When the lowermost metal ring in the array holder is pushed off the presser rods, the downward movement of the abutment members by the lifting and lowering means is put to a stop. Then, the abutment members are retracted away from the metal rings by the displacing means, and thereafter lifted to their original positions by the lifting and lowering means. The displacing means moves the abutment members toward the array holder. The above operation is repeated until all the metal rings are delivered off the terminal ends of the presser rods.

Since the displacing means of the delivery means according to the first aspect moves the abutment members in unison with each other, the distance that the lifting and lowering means vertically moves the abutment members can be relatively small, making the apparatus compact.

According to a second aspect of the present invention, the delivery means comprises a plurality of vertically movable abutment members movable along upper edges of the metal rings held in the array holder, lifting and lowering means for lifting and lowering the abutment members in unison with each other by a distance required to deliver the uppermost one of the metal rings in the array holder off terminal ends of the presser rods, and displacing means for retracting the abutment members which have been lowered by the lifting and lowering means to deliver the metal ring off the terminal ends of the presser rods, away from following metal rings.

With the delivery means according to the first aspect, the displacing means moves the abutment members along the upper edges of the metal rings arrayed in the array holder. Then, the abutment members are lowered in unison with each other by the lifting and lowering means. The upper edges of the metal rings abut against the abutment members, and are moved downwardly. When the lowermost metal ring in the array holder is pushed off the presser rods, only the abutment member that has pushed the metal ring is retracted away by the displacing means. Then, the abutment members are lowered in unison with each other. When the following one of the metal rings is pushed off the presser rods, only the abutment member that has pushed the metal ring is retracted away by the displacing means. The above operation is repeated until the lifting and lowering means lowers the abutment members until the uppermost metal ring having the smallest circumferential length in the array holder is pushed off the presser rods by the abutment member. Thereafter, all the abutment members are lifted to their original positions while they are being retracted.

Since the displacing means of the delivery means according to the second aspect retracts the abutment members successively from the lowermost one thereof while the abutment members are being lowered by the lifting and lowering means, all the metal rings can successively be deliv ered from the presser rods in one cycle of downward movement of the abutment members. Thus, the metal rings can be laminated in a very short period of time.

In the first and second aspects of the present invention, the abutment members preferably comprise plates arrayed in the array holder and horizontally movable between the metal rings which have been deformed by the holder rods and the presser rods, the plates having clearance recesses to avoid interference with the holder rods and the presser rods when the plates are displaced by the displacing means.

According to a third aspect of the present invention, the delivery means comprises an abutment member vertically movable in abutment against an upper edge of the uppermost one of the metal rings held in the array holder, and lifting and lowering means for lifting and lowering the abutment member to deliver the metal rings in the array in unison with each other successively from the lowermost one of the metal rings off terminal ends of the presser rods.

With the delivery means according to the third aspect, the abutment member is held in abutment against the upper edge of the uppermost metal ring held in the array holder, and is lowered by the lifting and lowering means. Therefore, the metal rings in the array are lowered in unison with each other, and delivered successively from the lowermost one of the metal rings off the terminal ends of the presser rods.

Because the metal rings can be delivered only upon the downward displacement of the abutment member by the lifting and lowering means of the delivery means according to the third aspect, the metal rings can be laminated in a very short period of time, and the apparatus can be constructed simply and inexpensively.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Like or corresponding parts are denoted by like or corresponding reference characters throughout views.

Figure 7A:
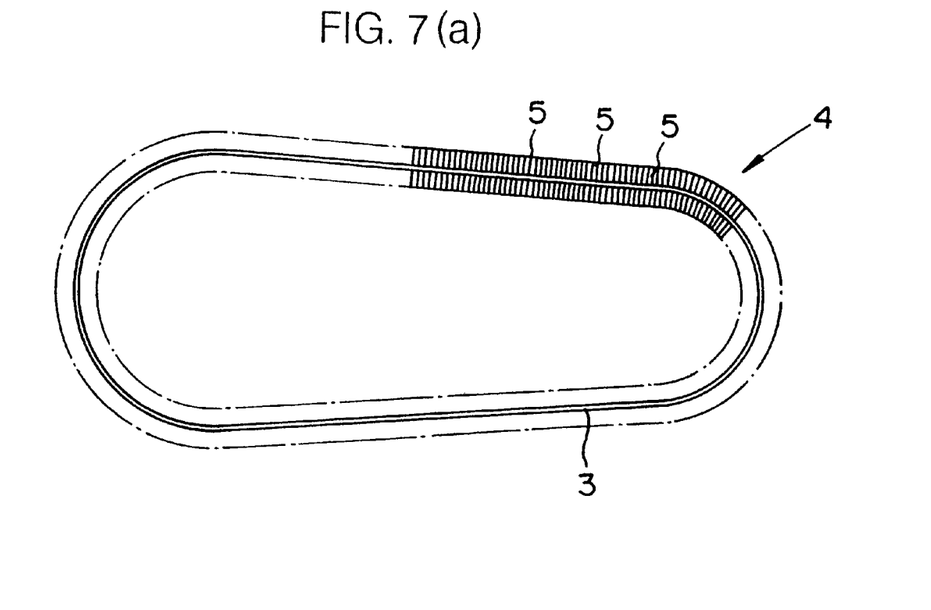
FIG. 7(a) is a plan view of a laminated ring assembled by the laminating apparatus.
Figure 7B:
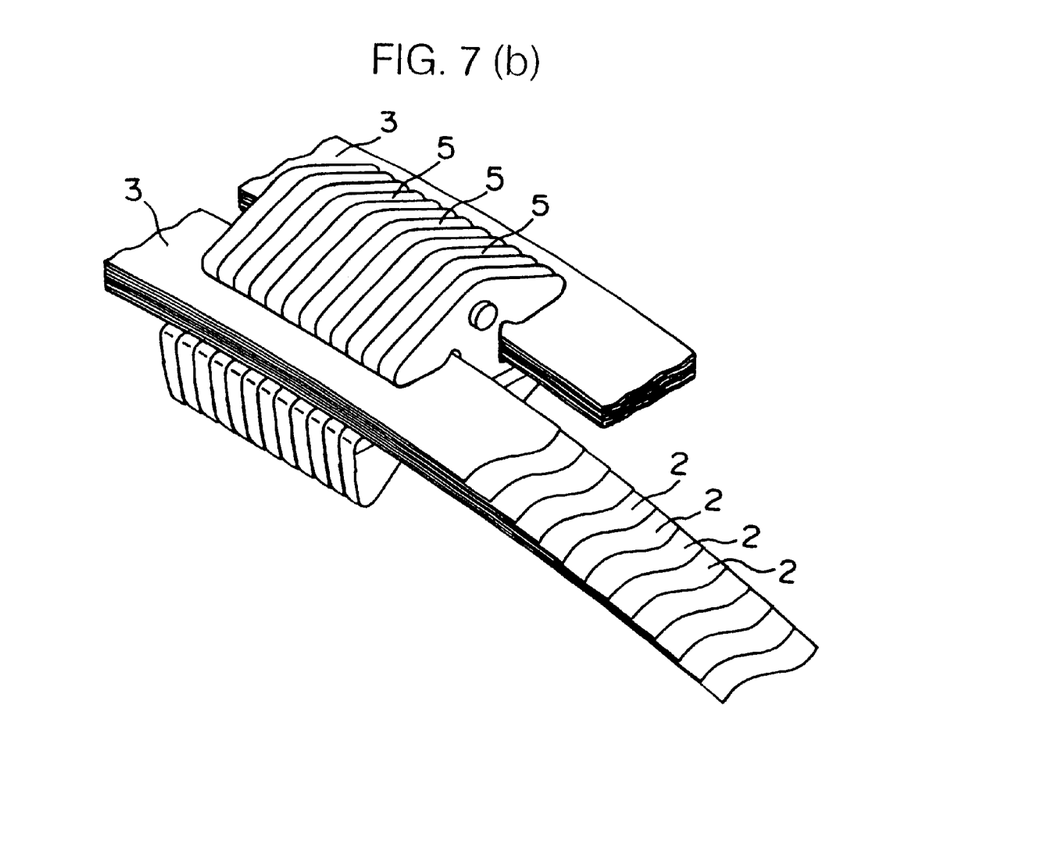
FIG. 7(b) is an enlarged fragmentary perspective view of the laminated ring shown in FIG. 7(a).

FIGS. 1(a), 1(b) through 5(a), 5(b), and 5(c) show a laminating apparatus 1 according to an embodiment of the present invention which laminates a plurality of metal rings 2 to assemble a laminated ring 3 as shown in FIGS. 7(a) and 7(b).

As shown in FIG. 7(a), the laminated ring 3 serves as a component of a belt 4 for transmitting the power in a continuously variable transmission (not shown) for an automobile. The belt 4 comprises an annular array of elements 5 each having a V-shaped surface. The belt 4 has a pair of laterally spaced laminated rings 3 that bundle the elements 5 flexibly together. As shown in FIG. 7(b), each of the laminated rings 3 comprises a plurality of metal rings 2 laminated transversely thereacross. The metal rings 2 have different circumferential lengths that progressively decrease in a direction from the outer circumferential side toward the inner circumferential side of the laminated ring 3. Stated otherwise, the metal rings 2 are laminated successively in a decreasing order of circumferential lengths radially inwardly of the laminated ring 3. The difference between the circumferential lengths of adjacent two of the metal rings 2 is very small to keep the interfitted metal rings 2 in close contact with each other for allowing the belt 4 to transmit the power efficiently.

Figure 1A:
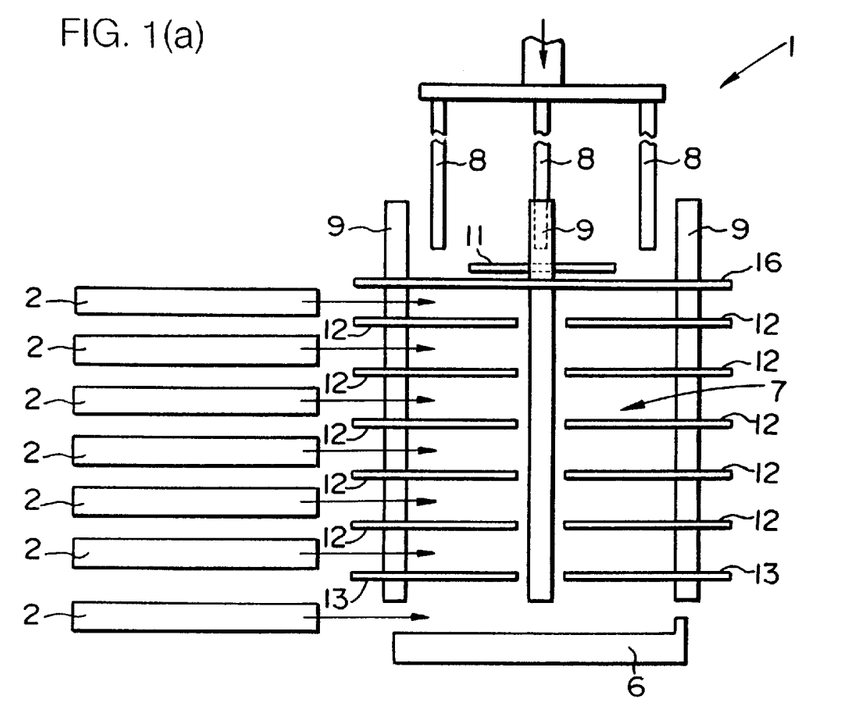
FIGS. 1(a) and 1(b) are side elevational views showing stages of operation of a laminating apparatus according to an embodiment of the present invention.

The structure of the laminating apparatus 1 will be described below with reference to FIGS. 1(a), 1(b) through 4. As shown in FIG. 1(a), the laminating apparatus 1 is supplied with a vertical array of axially aligned metal rings 2 and laminates, to the lowermost metal ring 2, the other metal rings 2 successively from the lowest one of these other metal rings 2. Of the supplied metal rings 2, the lowermost metal ring 2 has the largest circumferential length, and the upper metal ring 2 has the smallest circumferential length. The remaining metal rings 2 that are positioned between the lowermost and uppermost metal rings 2 have their circumferential lengths progressively smaller in the upward direction.

Figure 1B:
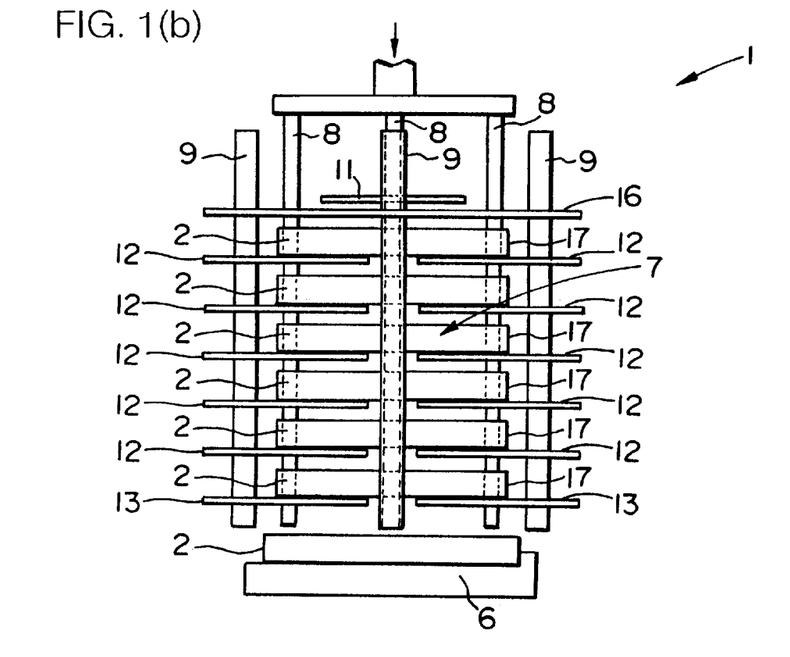

The laminating apparatus 1 has an assembly holder 6 for holding the lowermost metal ring 2 in the shape of a substantially true circle and an array holder 7 for holding the other metal rings 2 in a vertical array that has been supplied to the laminating apparatus 1. The laminating apparatus 1 also has three vertical parallel spaced holder rods 8 disposed above the array holder 7 and vertically movable by a lifting and lowering means such as a cylinder or the like. The holder rods 8 are lowered into the assembly holder 6 after the metal rods 2 have been supplied to the laminating apparatus 1, as shown in FIG. 1(b). When the holder rods 8 are lowered, they are inserted into the arrayed metal rings 2 to shift inwardly any metal rings 2 which have been displaced a large distance when they have been supplied, for thereby aligning the metal rings 2 coaxially with each other to vertically array the metal rings 2.

Figure 2A:
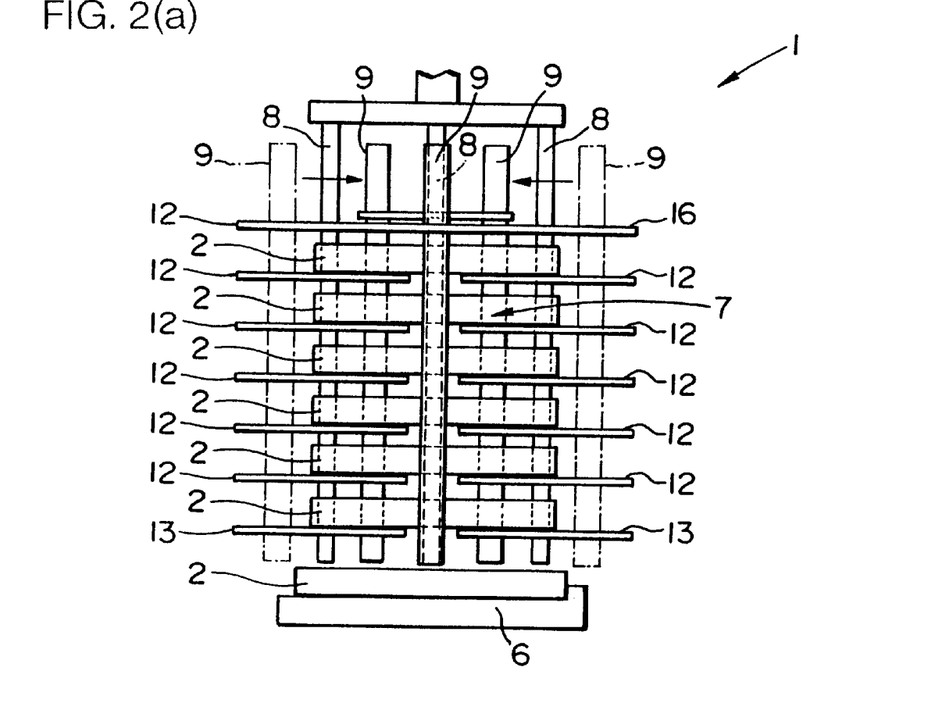
FIGS. 2(a) and 2(b) are side elevational views showing successive stages of operation following the stages of operation shown in FIGS. 1(a) and 1(b)

The laminating apparatus 1 also has three other vertical parallel spaced presser rods 9 disposed radially outwardly of the metal rings 2 arrayed in the array holder 7. The presser rods 9 are radially positioned at respective locations aligned with spaces between the holder rods 8. It is preferable that the laminating apparatus 1 have as many presser rods 9 as the number of holder rods 8. The laminating apparatus 1 may have three or more holder rods 8 and three or more presser rods 9. As shown in FIG. 1(b), the presser rods 9 have their terminal ends, i.e., lower ends, slightly spaced upwardly from the upper edge of the lowermost metal ring 2 that is held by the assembly holder 6. As shown in FIG. 2(a), the presser rods 9 are movable toward the center of the metal rings 2. The positional relationship between the holder rods 8 and the presser rods 9 is illustrated in FIG. 3(b).

Figure 3A:
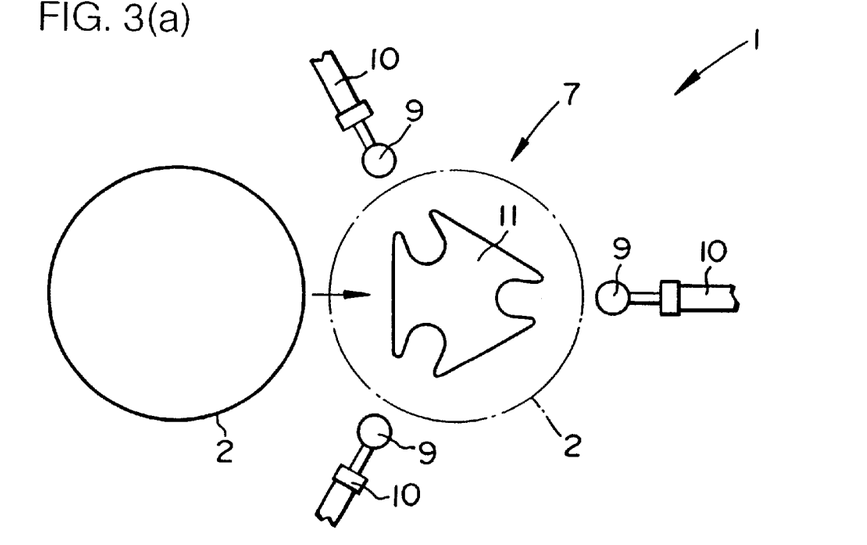
FIGS. 3(a) through 3(c) are plan views of the apparatus, showing the stages of operation shown in FIGS. 1(a), 1(b), and 2(a), respectively.
Figure 3B:
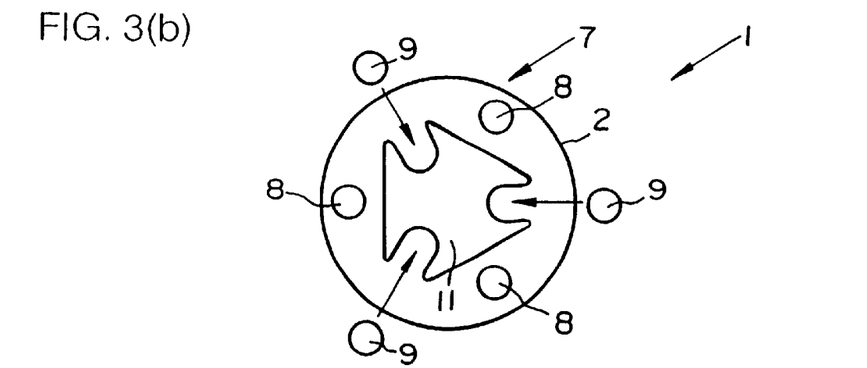

As shown in FIG. 3(a), the presser rods 9 are combined with respective fluid pressure cylinders 10. When the fluid pressure cylinders 10 are operated, the presser rods 9 push the metal rings 2 toward their center. The presser rods 9 are limited against further radially inward movement when they engage a limit plate 11 that is disposed centrally in the metal rings 2 and radially inwardly of the holder rods 8.

Figure 2B:
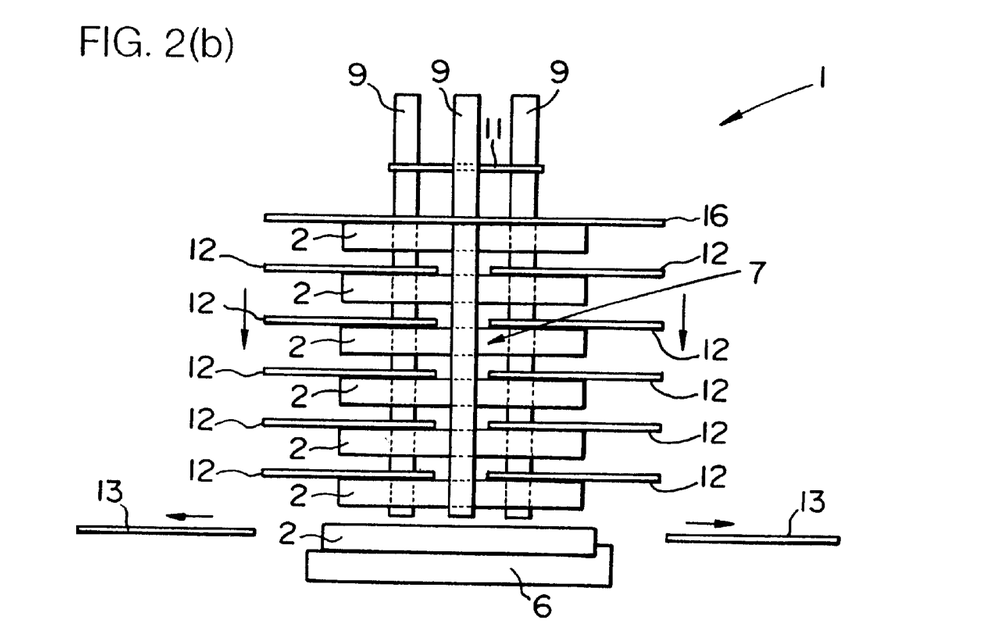
Figure 4:
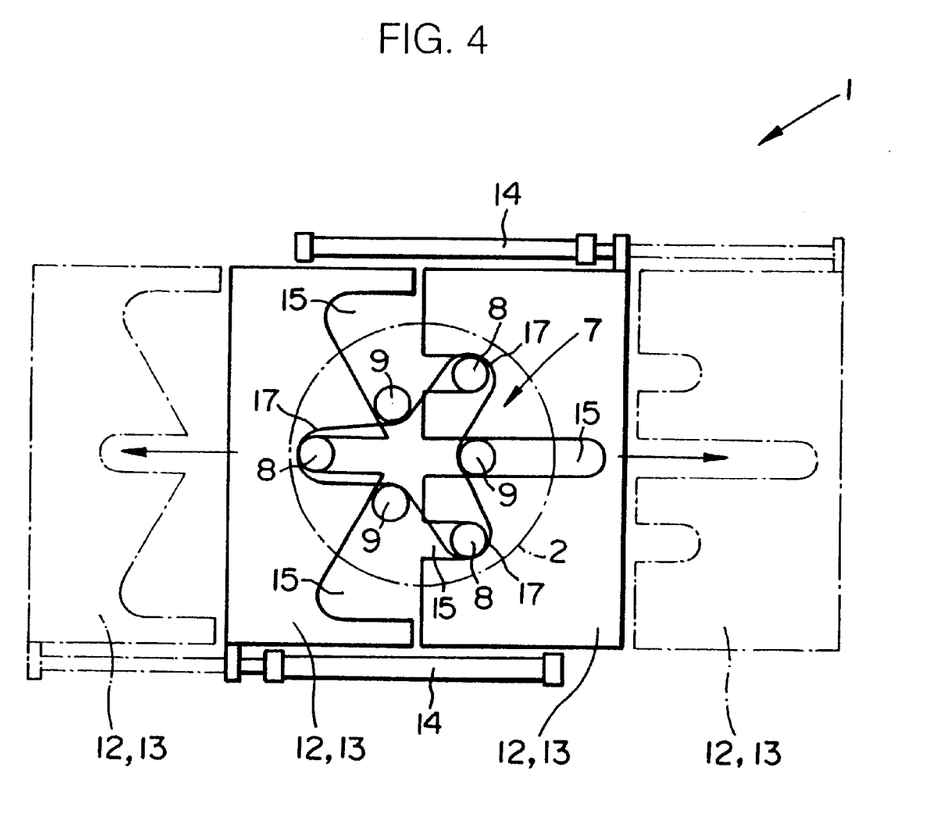
FIG. 4 is a plan view of certain components of the apparatus shown in FIGS. 1(a) and 1(b)

As shown in FIG. 1(a), the array holder 7 has a plurality of vertically spaced movable plates 12, 13 that are horizontally movable into and out of a position in the array holder 7 and that are also vertically movable, i.e., movable downwardly from the position shown in FIGS. 1(a) and 1(b). As shown in FIG. 1(b), the movable plates 12, 13 serve as support plates for placing metal rings 2 thereon when the metal rings 2 are supplied to the array holder 7. As shown in FIG. 4, each of the movable plates 12, 13 is separate into two members from its central region, and the two members are horizontally movable toward and away from each other by fluid pressure cylinders 14. The movable plates 12, 13 have clearance recesses 15 defined therein to avoid interference with the holder rods 8 and the presser rods 9 when the members of the movable plates 12, 13 move toward and away from each other. The movable plates 12, 13 are movable downwardly by a lifting and lowering means such as a cylinder or the like (not shown). The uppermost movable plate 12 is positioned beneath a vertically movable plate 16 that is vertically movable in unison with the movable plates 12, 13. The limit plate 11 is disposed above the vertically movable plate 16 (see FIG. 5(c)). As described in detail later on, as shown in FIG. 2(b), the movable plates 12 and the vertically movable plate 16, other than the lowermost movable plate 13, function as abutment members for abutting against and lowering the upper edges of the respective metal rings 2 when the movable plates 12 and the vertically movable plate 16 are lowered. The movable plates 12 and the vertically movable plate 16, other than the lowermost movable plate 13, the cylinders 12 for moving the movable plates 12, and the non-illustrated lifting and lowering means for vertically moving the movable plates 12, 13 in unison with each other jointly make up a delivery means according to the present invention.

A process of laminating metal rings 2 with the laminating apparatus 1 will be described below. First, as shown in FIGS. 1(a) and 3(a), the metal rings 2 are supplied to the array holder 7. At this time, the lowermost metal ring 2 whose circumferential length is the greatest among the supplied metal rings 2 is placed on the assembly holder 6 and held in the shape of a substantially true circle. The other metal rings 2 are placed on the movable plates 12, 13 which function as support plates.

Then, as shown in FIGS. 1(b) and 3(b), the holder rods 8 are lowered into the metal rings 2 on the movable plates 12, 13 to align the metal rings 2 coaxially with each other to vertically array the metal rings 2.

Figure 3C:
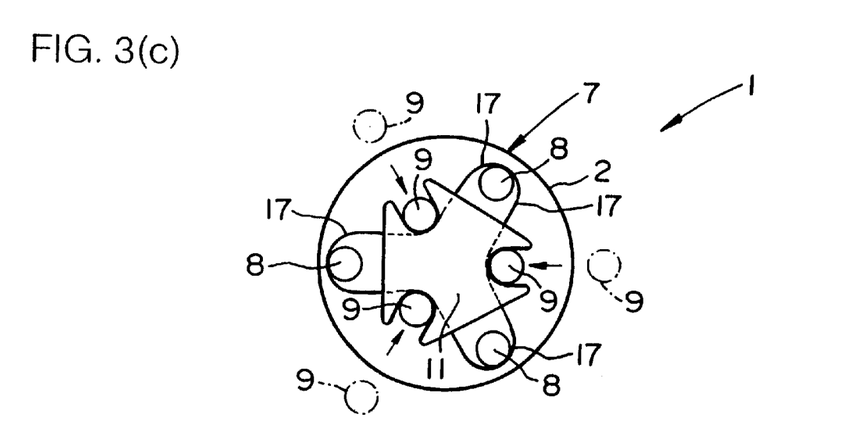

Thereafter, as shown in FIGS. 2(a) and 3(c), the presser rods 9 are displaced radially inwardly to press the metal rings 2 radially inwardly between the holder rods 8 until the presser rods 9 are brought to a stop by abutting engagement with the limit plate 11. The presser rods 9 deform each of the metal rings 2 resiliently into a shape of a reduced diameter which includes radial curved portions 17 between the holder rods 8, as shown in FIG. 3(c).

Then, as shown in FIG. 2(b), the movable plates 12 and the vertically movable plate 16, other than the lowermost movable plate 13, start moving downwardly, depressing the metal rings 2. At this time, the lowermost movable plate 13, which does not function as an abutment member, is retracted to a radially outer position out of interference with the assembly holder 6. The lowermost movable plate 13 that has been retracted is omitted from illustration in FIGS. 5(a) through 5(c).

The metal rings 2 shown in FIG. 2(b), which are deformed into the reduced-diameter shape, are frictionally engaged by the presser rods 9 and remain slidably supported thereby against falling down due to gravity. Since the curved portions 17 that are present in the metal rings 2 are maintained in their shape by being pressed by the presser rods 9, the holder rods 8 may be lifted and retracted away from the metal rings 2 to reduce any sliding resistance which will be imposed on the metal rings 2 when they will be lowered. In the position of the metal rings 2 shown in FIG. 2(b), the holder rods 8 may remain positioned within the metal rings 2 to keep the curved portions 17 reliably shaped as desired.

Figure 5A:
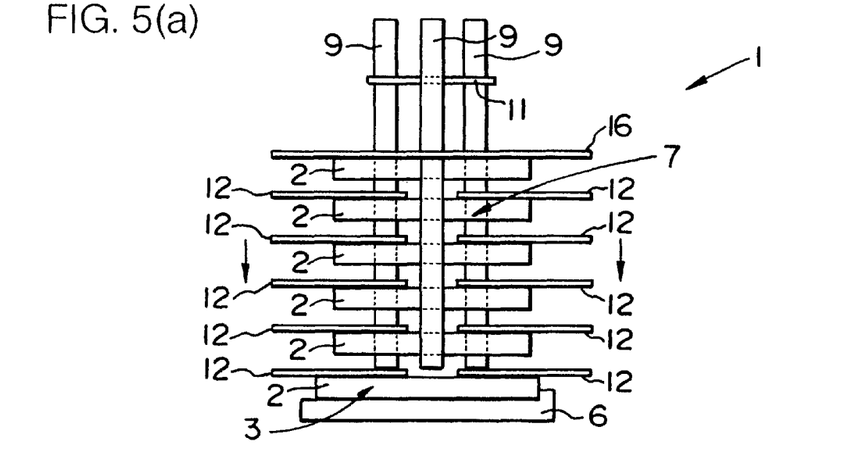
FIGS. 5(a), 5(b), and 5(c) are side elevational views showing successive stages of operation following the stages of operation shown in FIGS. 2(a) and 2(b)

Then, as shown in FIG. 5(a), the metal ring 2 located in the lowermost position in the array holder 7 is lowered by the corresponding movable plate 12. The lowered metal ring 2 is placed into the metal ring 2 positioned on the assembly holder 6, and released off the terminal ends of the presser rods 9. As soon as the metal ring 2 disengages from the presser rods 9, it restores its circular shape under its own resiliency and is brought into intimate contact with the inner surface of the metal ring 2 on the assembly holder 6.

Figure 5B:
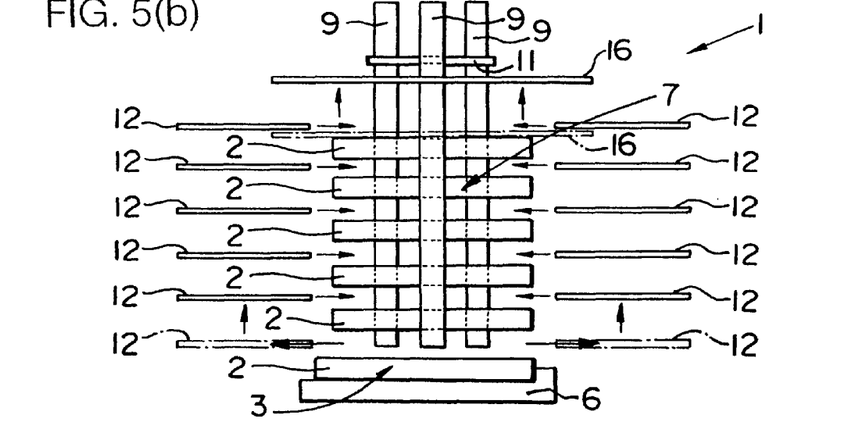
Figure 5C:
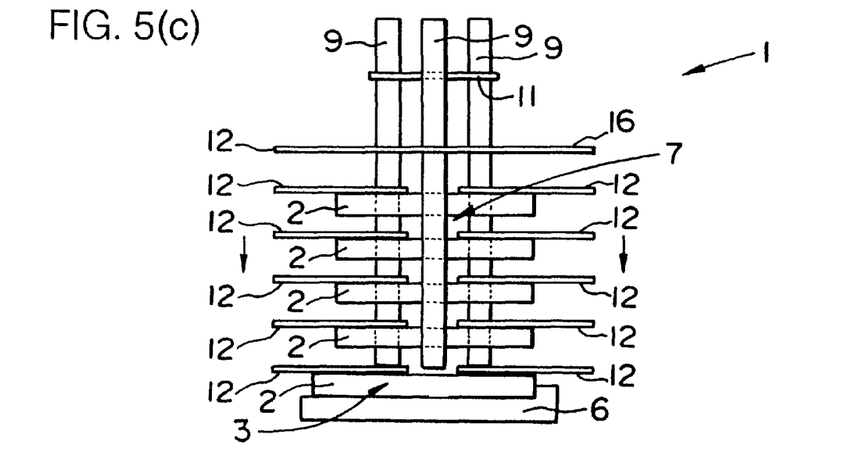

Thereafter, as shown in FIG. 5(b), the movable plates 12 each functioning as an abutment member are retracted radially outwardly of the array holder 7. The vertically movable plate 16 and the movable plates 12 are then lifted a distance corresponding to one metal ring 2. Then, as shown in FIG. 5(c), the movable plates 12 are moved radially inwardly into spaces between the metal rings 2 which follow the metal ring 2 that has been inserted into the metal ring 2 on the assembly holder 6. Subsequently, the process shown in FIGS. 5(a) through 5(c) is repeated to deliver the metal rings 2 successively from the lowest one of these metal rings 2 onto the assembly holder 6 and laminate the metal rings 2 on the assembly holder 6.

Figure 6:
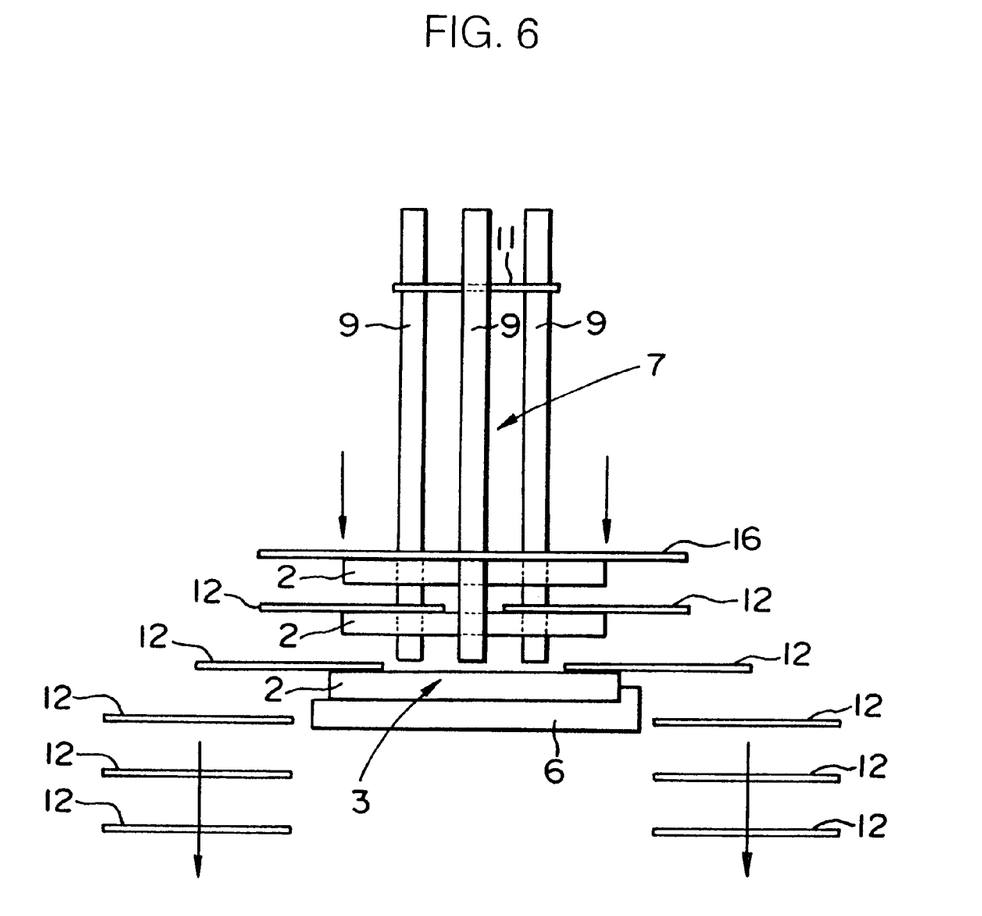
FIG. 6 is a side elevational view showing a stage of operation of a laminating apparatus according to another embodiment of the present invention.

FIG. 6 shows a stage of operation of a laminating apparatus according to another embodiment of the present invention. In FIG. 6, while the movable plates 12 each functioning as an abutment member are being lowered together, they are retracted radially outwardly successively from the lowermost one of those movable plates 2. In this manner, the metal rings 2 are successively delivered onto the assembly holder 6 and laminated thereon in one cycle of downward movement of the movable plates 12. The metal rings 2 can thus quickly be laminated on the assembly holder 6 without a repetition of radially inward and outward movement and vertical movement of each of the movable plates 12.

Alternatively, all the movable plates 12, 13 may be retracted from the position shown in FIG. 2(b), and the vertically movable plate 16 may be lowered to bring all the metal rings 2 together and depress the metal rings 2 onto the assembly holder 6. In this manner, all the metal rings 2 can quickly be delivered onto the assembly holder 6 and laminated thereon in one cycle of descending movement of the vertically movable plate 16.

In the above embodiments, the uppermost metal ring 2 in the array holder 7 is lowered by a descent of the vertically movable plate 16. However, the vertically movable plate 16 may be dispensed with, and the limit plate 11 for limiting the presser rods 9 may be arranged so as to be movable vertically. In such a modification, the limit plate 11 abuts against the upper edge of the uppermost metal ring 2 in the array holder 7, and is then lowered to move the uppermost metal ring 2 downwardly.

Although certain preferred embodiments of the present invention have been shown and described in detail, it should be understood that various changes and modifications may be made therein without departing from the scope of the appended claims.

What is claimed is:

1. A method of laminating a plurality of endless metal rings having different respective circumferential lengths successively in the order of increasing circumferential length from an outer circumferential side toward an inner circumferential side, comprising the steps of:

holding a metal ring of the greatest circumferential length in the shape of a substantially true circle and holding the other metal rings in an array successively in the order of increasing circumferential length toward said metal ring of the greatest circumferential length in a transverse direction of said metal ring of the greatest circumferential length;

inserting at least three holder rods, which are spaced from each other and extend parallel to each other, into said metal rings along the array thereof to hold the metal rings in substantially coaxial alignment with each other;

while holding the metal rings from inner surfaces thereof with said holder rods, pressing at least three presser rods, which are disposed in respective locations corresponding to spaces between said holder rods, from outside of said other metal rings through the spaces between said holder rods toward the center of said metal rings, thereby deforming said other metal rings resiliently into a shape including curved portions projecting radially along said holder rods and having a reduced diameter; and delivering the deformed metal rings successively in said array along said presser rods from terminal ends of the presser rods into a position in which the metal ring of the greatest circumferential length is held, and releasing the deformed metal rings successively off said presser rods within the metal ring of the greatest circumferential length to allow the released metal rings to successively restore a shape of a substantially true circle along an inner circumferential surface of the metal ring of the greatest circumferential length and to be successively laminated to the metal ring of the greatest circumferential length.

2. An apparatus for laminating a plurality of endless metal rings having different respective circumferential lengths successively in the order of increasing circumferential length from an outer circumferential side toward an inner circumferential side, comprising:

an assembly holder for holding a metal ring of the greatest circumferential length in the shape of a substantially true circle;

an array holder for holding the other metal rings in an array successively in the order of increasing circumferential length downwardly in said assembly holder toward said metal ring of the greatest circumferential length in a transverse direction of said metal ring of the greatest circumferential length;

at least three holder rods, which are spaced from each other and extend parallel to each other, vertically movable toward said array holder for being into said metal rings along the array thereof to hold the metal rings in substantially coaxial alignment with each other when the holder rods are lowered;

at least three presser rods for pressing said metal rings from outside of the metal rings in said array holder through spaces between said holder rods toward the center of said metal rings, thereby deforming said metal rings in said array holder resiliently into a shape including radially projecting curved portions held by said holder rods and having a reduced diameter; and delivery means for delivering the deformed metal rings in said array holder successively in said array toward said assembly holder and releasing the deformed metal rings successively off said presser rods.

3. An apparatus according to claim 2, further comprising:

a limit plate for limiting said presser rods by abutting against the presser rods when the presser rods press and deform the metal rings, said limit plate being disposed inwardly of said holder rods in an upper portion of said array holder.

4. An apparatus according to claim 2, wherein said delivery means comprises:

a plurality of vertically movable abutment members movable along upper edges of the metal rings held in said array holder;

lifting and lowering means for lifting and lowering said abutment members in unison with each other by a distance required to deliver the lowermost one of the metal rings in said array holder off terminal ends of said presser rods; and displacing means for retracting said abutment members which have been lowered by said lifting and lowering means in unison with each other away from spaces between said metal rings and inserting said abutment members which have been lifted by said lifting and lowering means in unison with each other into the spaces between said metal rings.

5. An apparatus according to claim 4, wherein said abutment members comprise plates arrayed in said array holder and horizontally movable between the metal rings which have been deformed by said holder rods and said presser rods, said plates having clearance recesses to avoid interference with said holder rods and said presser rods when the plates are displaced by said displacing means.

6. An apparatus according to claim 2, wherein said delivery means comprises:

a plurality of vertically movable abutment members movable along upper edges of the metal rings held in said array holder;

lifting and lowering means for lifting and lowering said abutment members in unison with each other by a distance required to deliver the uppermost one of the metal rings in said array holder off terminal ends of said presser rods; and displacing means for retracting said abutment members which have been lowered by said lifting and lowering means to deliver the metal ring off the terminal ends of said presser rods, away from following metal rings.

7. An apparatus according to claim 5, wherein said abutment members comprise plates arrayed in said array holder and horizontally movable between the metal rings which have been deformed by said holder rods and said presser rods, said plates having clearance recesses to avoid interference with said holder rods and said presser rods when the plates are displaced by said displacing means.

8. An apparatus according to claim 2, wherein said delivery means comprises:

an abutment member vertically movable in abutment against an upper edge of the uppermost one of the metal rings held in said array holder; and lifting and lowering means for lifting and lowering said abutment member to deliver the metal rings in the array in unison with each other successively from the lowermost one of the metal rings off terminal ends of said presser rods.

* * * * *